(12) United States Patent
Nakamura et al.

(10) Patent No.: US 12,484,808 B2
(45) Date of Patent: Dec. 2, 2025

(54) METHOD AND DEVICE FOR MEASURING CONCENTRATION OF COMPONENT

(71) Applicant: NTT, Inc., Tokyo (JP)

(72) Inventors: Masahito Nakamura, Tokyo (JP); Yujiro Tanaka, Tokyo (JP); Michiko Seyama, Tokyo (JP); Daichi Matsunaga, Tokyo (JP)

(73) Assignee: NTT, INC., Tokyo (JP)

(*) Notice: Subject to any disclaimer, the term of this patent is extended or adjusted under 35 U.S.C. 154(b) by 777 days.

(21) Appl. No.: 17/416,611

(22) PCT Filed: Dec. 10, 2019

(86) PCT No.: PCT/JP2019/048257
§ 371 (c)(1),
(2) Date: Jun. 21, 2021

(87) PCT Pub. No.: WO2020/137517
PCT Pub. Date: Jul. 2, 2020

(65) Prior Publication Data
US 2022/0079479 A1    Mar. 17, 2022

(30) Foreign Application Priority Data

Dec. 25, 2018 (JP) ................. 2018-240800

(51) Int. Cl.
*A61B 5/145* (2006.01)
*A61B 5/00* (2006.01)
*A61B 5/1455* (2006.01)

(52) U.S. Cl.
CPC ........ *A61B 5/14532* (2013.01); *A61B 5/0053* (2013.01); *A61B 5/0095* (2013.01);
(Continued)

(58) Field of Classification Search
CPC . A61B 5/14532; A61B 5/0053; A61B 5/0095; A61B 5/0048; A61B 5/0059;
(Continued)

(56) References Cited

U.S. PATENT DOCUMENTS

2002/0123688 A1\* 9/2002 Yamauchi ............ A61B 8/0883
600/443
2005/0101846 A1   5/2005 Fine et al.
(Continued)

FOREIGN PATENT DOCUMENTS

| JP | 2007510492 A | 4/2007 |
|----|----|----|
| JP | 2007229320 A | 9/2007 |
| JP | 2010104858 A | 5/2010 |

OTHER PUBLICATIONS

Kuwabara, et al., "Blood Flow Observed with Smartphone—Ultracompact Wearable Blood Flow Sensor", NTT Technical Journal, vol. 13, No. 1, Jan. 2015, pp. 21-26. As discussed in the specification.

*Primary Examiner* — Jennifer Robertson
*Assistant Examiner* — Jonathan Drew Moroneso
(74) *Attorney, Agent, or Firm* — Slater Matsil, LLP (57) ABSTRACT

A pressurizing unit applies pressure around a measurement site of a measurement subject so as to suppress blood flow at the measurement site during a set pressurizing time. While the pressurizing unit is applying pressure around the measurement site, a detection unit detects a photoacoustic signal generated at the measurement site irradiated with a light beam. The detection unit detects a photoacoustic signal when a preset time has elapsed after the pressurizing unit started to apply pressure around the measurement site.

5 Claims, 6 Drawing Sheets

(52) U.S. Cl.
CPC .......... *A61B 5/0048* (2013.01); *A61B 5/0059* (2013.01); *A61B 5/0093* (2013.01); *A61B 5/145* (2013.01); *A61B 5/1455* (2013.01)

(58) Field of Classification Search
CPC ..... A61B 5/0093; A61B 5/145; A61B 5/1455; A61B 5/14552; A61B 8/13; G01N 29/24; G01N 29/32; G01N 29/48
See application file for complete search history.

(56) References Cited

U.S. PATENT DOCUMENTS

| | | | |
|---|---|---|---|
| 2007/0197886 A1 | 8/2007 | Naganuma et al. | |
| 2015/0359437 A1* | 12/2015 | Maltz .................. | A61B 5/6828 600/481 |
| 2020/0337611 A1* | 10/2020 | Abul-Haj ............. | A61B 5/0097 |

* cited by examiner

METHOD AND DEVICE FOR MEASURING CONCENTRATION OF COMPONENT

CROSS-REFERENCE TO RELATED APPLICATIONS

This application is a national phase entry of PCT Application No. PCT/JP2019/048257, filed on Dec. 10, 2019, which claims priority to Japanese Application No. 2018-240800, filed on Dec. 25, 2018, which applications are hereby incorporated herein by reference.

TECHNICAL FIELD

The present invention relates to a component concentration measuring method and device, and more specifically relates to a component concentration measuring method and device for non-invasively measuring the concentration of a component such as glucose in blood.

BACKGROUND

Knowing (measuring) the blood glucose level is very important when determining an insulin dosage for a person with diabetes, preventing diabetes, and so on. The blood glucose level is the concentration of glucose in blood, and photoacoustics is a well-known method for measuring the concentration of this type of component (see PTL 1).

When a living body is irradiated with a certain amount of light (electromagnetic waves), the emitted light is absorbed by molecules of the living body. For this reason, measurement target molecules in the portion irradiated with light are locally heated and expand, thus emitting acoustic waves. The pressure of such acoustic waves is dependent on the quantity of molecules that absorb the light. Photoacoustics is a method of measuring a molecular quantity in a living body by measuring such acoustic waves (a photoacoustic signal). Acoustic waves are pressure waves that propagate in a living body and have a characteristic of undergoing less diffusion than electromagnetic waves, and therefore photoacoustics can be said to be suited to the measurement of a blood component in a living body.

Photoacoustic measurement makes it possible to continuously monitor the glucose concentration in blood. Furthermore, photoacoustic measurement does not require a blood sample, and does not cause the measurement subject discomfort.

CITATION LIST

Patent Literature

PTL 1 Japanese Patent Application Publication No. 2010-104858

Non Patent Literature

NPL 1 Kei Kuwabara et al, "Blood Flow Observed with Smartphone—Ultracompact Wearable Blood Flow Sensor", NTT *Gizyutu Journal*, pp. 21-24, November 2014.

SUMMARY

Technical Problem

Incidentally, in a site of a human body that is subjected to this kind of measurement, the diameter of a blood vessel constantly changes, and is not fixed. For example, when a blood flow rate is measured, periodic oscillation occurring at about 10-second intervals is seen independent of heartbeat even if the measurement subject is resting. This oscillation occurring at about 10-second intervals represents the influence of constriction movement of the blood vessel, which is called vasomotion. When the diameter of the blood vessel changes due to such constriction movement of the blood vessel, the ratio of a plasma to an interstitial fluid in the blood in this site changes, thus causing measurement error in component concentration to occur.

Embodiments of the present invention were achieved in order to solve the foregoing problems, and an object of embodiments of the present invention is to suppress measurement error that occurs due to a change in the state of a blood vessel when measuring the concentration of a component such as glucose in a human body using photoacoustics.

Means for Solving the Problem

A component concentration measuring method according to embodiments of the present invention includes a first step of applying pressure around a measurement site of a measurement subject so as to suppress blood flow at the measurement site, a second step of irradiating the measurement site with a light beam having a wavelength that is absorbed by a measurement target substance, and detecting a photoacoustic signal generated at the measurement site when a set time has elapsed after pressure started to be applied around the measurement site, and a third step of obtaining a concentration of the substance using the photoacoustic signal.

A configuration example of the above-described component concentration measuring method includes a fourth step of stopping applying pressure around the measurement site after detecting the photoacoustic signal.

In a configuration example of the above-described component concentration measuring method, start of applying pressure, detection of the photoacoustic signal, and stop of applying pressure are periodically repeated.

In a configuration example of the above-described component concentration measuring method, in the second step, the photoacoustic signal is detected when half of a period from start of applying pressure to the next start of applying pressure has elapsed.

In a configuration example of the above-described component concentration measuring method, the period from start of applying pressure to the next start of applying pressure is 5 to 20 seconds.

In a configuration example of the above-described component concentration measuring method, the substance is glucose.

A component concentration measuring device according to embodiments of the present invention includes a light emitting unit configured to irradiate a measurement site of a measurement subject with a light beam having a wavelength that is absorbed by a measurement target substance, a pressurizing unit configured to apply pressure around the measurement site so as to suppress blood flow at the measurement site, a detection unit configured to detect a photoacoustic signal generated at the measurement site irradiated with the light beam emitted from the light emitting unit, while the pressurizing unit is applying pressure around the measurement site, and a concentration calculation unit configured to obtain a concentration of the substance using the photoacoustic signal.

In a configuration example of the above-described component concentration measuring device, the detection unit detects the photoacoustic signal when a preset time has elapsed after the pressurizing unit started applying pressure around the measurement site.

In a configuration example of the above-described component concentration measuring device, a control unit configured to control a pressurizing operation that is performed by the pressurizing unit, and a photoacoustic signal detection operation that is performed by the detection unit is included.

In a configuration example of the above-described component concentration measuring device, the control unit periodically repeats causing the pressurizing unit to start applying pressure, causing the detection unit to detect the photoacoustic signal, and causing the pressurizing unit to stop applying pressure.

In a configuration example of the above-described component concentration measuring device, the control unit causes the detection unit to detect the photoacoustic signal when half of a period from start of applying pressure to the next start of applying pressure has elapsed.

In a configuration example of the above-described component concentration measuring device, the control unit sets the period of control from start of applying pressure to the next start of applying pressure to 5 to 20 seconds.

In a configuration example of the above-described component concentration measuring device, the substance is glucose, and the light emitting unit emits the light beam having a wavelength absorbed by glucose.

Effects of Embodiments of the Invention

As described above, according to embodiments of the present invention, a photoacoustic signal is detected when a set time has elapsed after pressure started to be applied around a measurement site, thus, providing an excellent effect of making it possible to suppress measurement error that occurs due to a change in the state of a blood vessel when measuring the concentration of a component such as glucose in a human body using photoacoustics.

DETAILED DESCRIPTION OF ILLUSTRATIVE EMBODIMENTS

Figure 1:
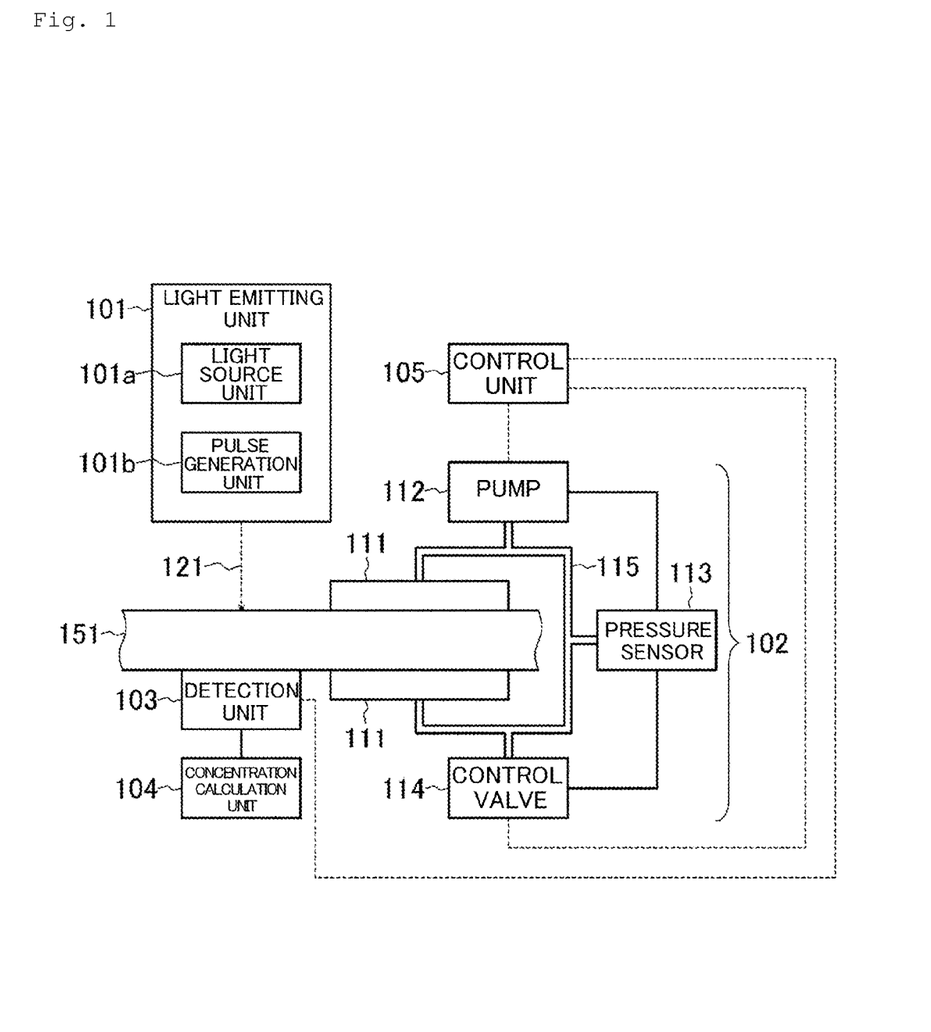
FIG. 1 is a configuration diagram showing a configuration of a component concentration measuring method/device according to an embodiment of the present invention.

The following describes a component concentration measuring device according to an embodiments of the present invention with reference to FIG. 1. This component concentration measuring device includes a light emitting unit 101, a pressurizing unit 102, a detection unit 103, a concentration calculation unit 104, and a control unit 105.

The light emitting unit 101 has a robustness for generating a light beam 121 having a wavelength that is absorbed by a measurement target substance, and can emit the generated light beam 121 toward a measurement site 151 of a measurement subject. For example, in the case where the measurement target substance is glucose in blood, the light emitting unit 101 includes a light source unit 101a provided with a light source such as a light-emitting element that generates the light beam 121 having a wavelength that is absorbed by glucose and a drive circuit of the light source, and a pulse generation unit 101b that converts the light beam 121 generated by the light source into pulsed light that has a pre-set pulse width.

Note that glucose exhibits a property of absorbing light in wavelength bands near 1.6 μm and 2.1 μm (see PTL 1). If glucose is the measurement target substance, the light beam 121 emitted by the light emitting unit 101 is light beam having a pulse width of 0.02 seconds or longer.

The pressurizing unit 102 applies pressure around the measurement site 151 of the measurement subject so as to suppress blood flow at the measurement site 151. The pressurizing unit 102 includes an air bag 11, a pump 112, a pressure sensor 113, and a control valve 114, for example.

As a result of air being supplied via a tube 115 using the pump 112, the air bag 11 is expanded so as to apply pressure to the measurement site 151. The pressure of the air that is supplied is measured by the pressure sensor 113 via the tube 115, and the pump 112 supplies air such that the air pressure that is measured by the pressure sensor 113 matches a set value. As a result of continuing this pressure for a preset time or longer, pressure is applied to a blood vessel at the measurement site 151, and the blood flow is suppressed (for example, ischemia is induced).

In addition, the control valve 114 opens and closes a valve at an interval of a set time (pressurizing time), for example. When the control valve 114 is closed, supply of air using the pump 112 is started and the air bag 11 is expanded, as described above. Also, when the control valve 114 is open, supply of air using the pump 112 is stopped, the pressure in the air bag 11 is reduced, and the pressure that is applied to the measurement site 151 using the air bag 11 is stopped.

The detection unit 103 detects a photoacoustic signal generated at the measurement site 151 irradiated with the light beam 121, while the pressurizing unit 102 is applying pressure around the measurement site 151. The detection unit 103 detects a photoacoustic signal when a set time has elapsed after the pressurizing unit 102 started to apply pressure around the measurement site 151. The photoacoustic signal detected by the detection unit 103 is stored in an external storage device 104b (not illustrated) that constitutes the concentration calculation unit 104 to be described later, along with measured time information, for example.

The detection unit 103 can be a unit that employs a piezoelectric effect or an electrostrictive effect (e.g., a crystal microphone, a ceramic microphone, or a ceramic ultrasonic sensor), a unit that employs electromagnetic induction (e.g., a dynamic microphone or a ribbon microphone), a unit that employs an electrostatic effect (e.g., a condenser microphone), or a unit that employs magnetostriction (e.g., a magnetostrictive vibrator). For example, in the case of employing a piezoelectric effect, the unit includes a crystal made of a frequency flat-type electrostrictive element (ZT)

or PVDF (polyvinylidene fluoride). The detection unit 103 can be constituted by a PZT that includes an FET (Field Effect Transistor) amplifier.

The concentration calculation unit 104 obtains the concentration of the above substance using the photoacoustic signal detected by the detection unit 103. For example, the concentration calculation unit 104 obtains the concentration of a measurement target, namely glucose in blood at the measurement site 151 based on the photoacoustic signal.

Figure 2:
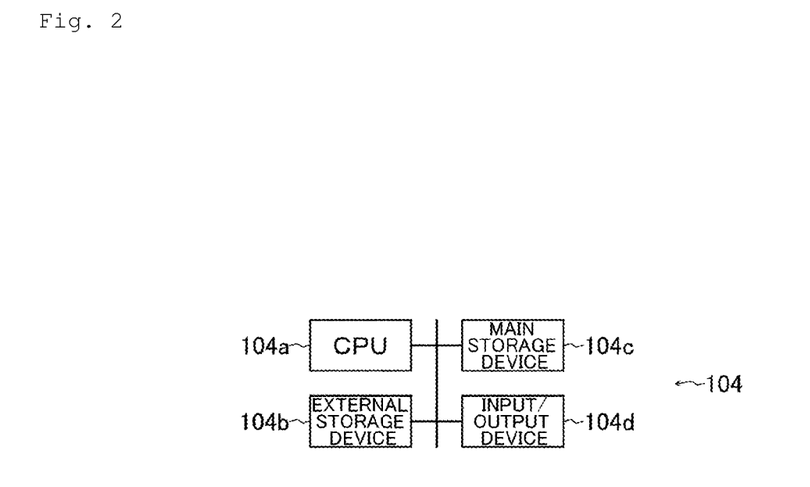
FIG. 2 is a configuration diagram showing a hardware configuration of a concentration calculation unit 104 constituting a component concentration measuring method/device according to an embodiment of the present invention.

Here, a hardware configuration of the concentration calculation unit 104 will be described with reference to FIG. 2. The concentration calculation unit 104 is a computer apparatus that includes a CPU (Central Processing Unit) 104a, the external storage device 104b, a main storage device 104c, an input/output device 104d for connecting an external apparatus or the like to the concentration calculation unit 104, for example. The photoacoustic signal detected by the detection unit 103 is received via the input/output device 104d, and is stored as digital data in the external storage device 104b, and, as a result of the CPU 104a operating in accordance with a program deployed in the main storage device 104c, the above-described function of the concentration calculation unit 104 is realized. The obtained concentration is stored in the external storage device 104c such that the obtained concentration can be read out via the input/output device 104d.

The control unit 105 controls a pressurizing operation by the pressurizing unit 102 and a detection operation of a photoacoustic signal by the detection unit 103. For example, when an instruction to start concentration measurement is input, the control unit 105 closes the control valve 114, causes the pump 112 to operate, and starts applying pressure around the measurement site 151 using the air bag 11. Next, the control unit 105 causes the detection unit 103 to detect a photoacoustic signal when a preset time has elapsed from start of applying pressure. Next, when the detection unit 103 detects a photoacoustic signal, the control unit 105 stops the operation of the pump 112, opens the control valve 114, and stops applying pressure that is being applied around the measurement site 151 using the air bag 11.

In addition, the control unit 105 periodically repeats causing the pressurizing unit 102 to start applying pressure around the measurement site 151, the detection unit 103 to detect a photoacoustic signal, and the pressurizing unit 102 to stop applying pressure around the measurement site 151. In this case, the control unit 105 cause the detection unit 103 to detect a photoacoustic signal when half of the period from start of applying pressure to the next start of applying pressure has elapsed. Also, the control unit 105 carries out the above-described repetition of the series of control, for example, during a preset time period.

Figure 3:
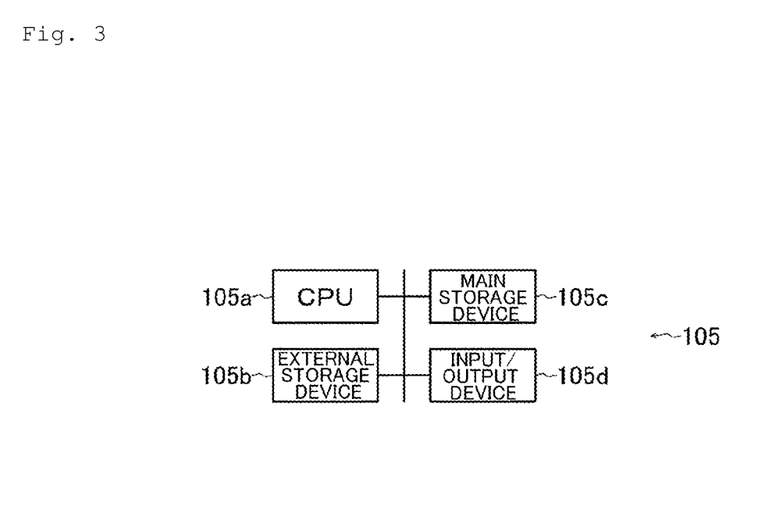
FIG. 3 is a configuration diagram showing a hardware configuration of a control unit 105 constituting a component concentration measuring method/device according to an embodiment of the present invention.

Here, a hardware configuration of the control unit 105 will be described with reference to FIG. 3. The control unit 105 is a computer apparatus that includes a CPU 105a, an external storage device 105b, a main storage device 105c, and an input/output device 105d for connecting an external apparatus or the like to the control unit 105, for example. As a result of the CPU 105a operating in accordance with a program deployed in the main storage device 105c, the above-described function of the control unit 105 is realized.

Figure 4:
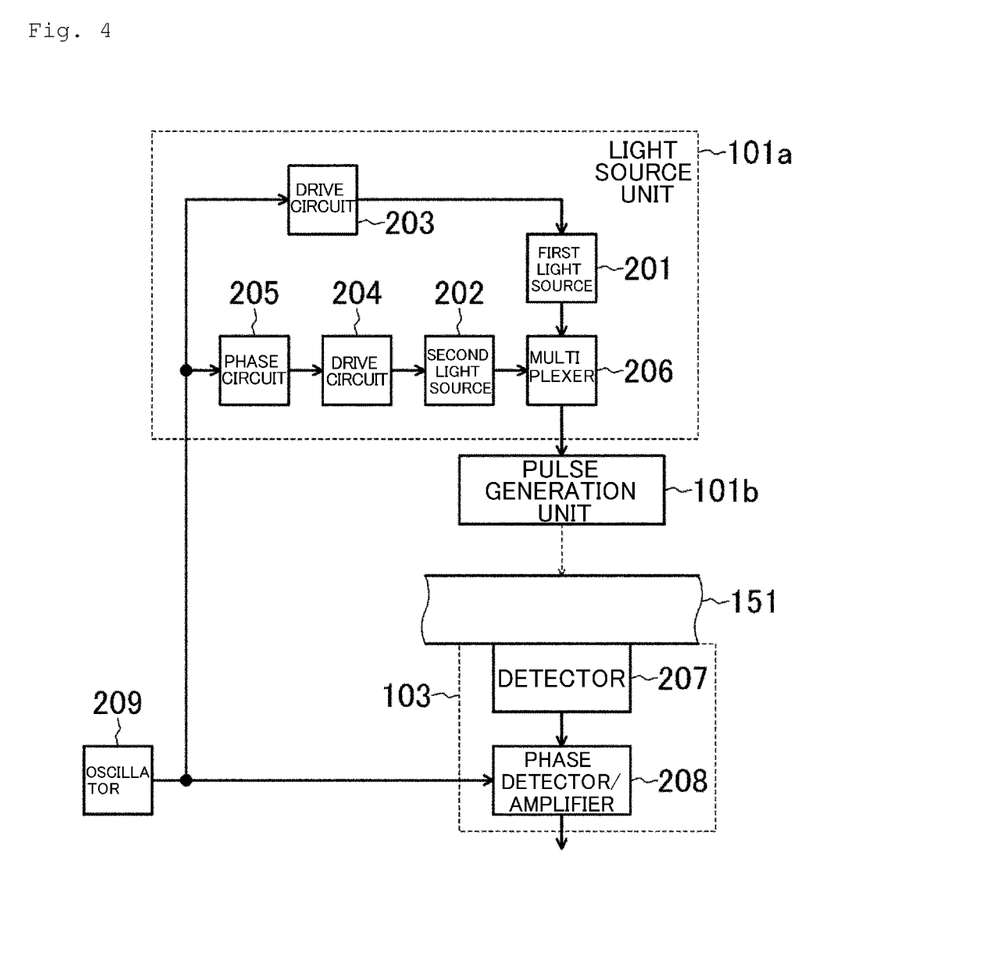
FIG. 4 is a configuration diagram showing a more detailed configuration of a component concentration measuring device according to an embodiment of the present invention.

The following is a more detailed description of the light emitting unit 101 and the detection unit 103 with reference to FIG. 4. First, the light source unit 101a includes a first light source 201, a second light source 202, a drive circuit 203, a drive circuit 204, a phase circuit 205, and a multiplexer 206. Also, the detection unit 103 includes a detector 207, a phase detector/amplifier 208, and an oscillator 209.

The oscillator 209 is connected to the drive circuit 203, the phase circuit 205, and the phase detector/amplifier 208 by signal lines. The oscillator 209 transmits signals to the drive circuit 203, the phase circuit 205, and the phase detector/amplifier 208.

The drive circuit 203 receives the signal transmitted by the oscillator 209 and supplies drive power to the first light source 201 so as to cause the first light source 201 to emit light whose intensity has been modulated in synchronization with the frequency of the received signal. The first light source 201 is a semiconductor laser, for example.

The phase circuit 205 receives the signal transmitted by the oscillator 209, applies a 180-degree phase change to the received signal, and transmits the resulting signal to the drive circuit 204 via a signal line.

The drive circuit 204 receives the signal transmitted by the phase circuit 205 and supplies drive power to the second light source 202 so as to cause the second light source 202 to emit light whose intensity has been modulated in synchronization with the frequency of the received signal and the 180-degree phase changed signal received from the phase circuit 205. The second light source 202 is a semiconductor laser, for example.

The first light source 201 and the second light source 202 output light beams that have mutually different wavelengths, and the output light beams are each guided to the multiplexer 206 by an optical wave transmitting means. The wavelengths of the first light source 201 and the second light source 202 are set such that the wavelength of one of the light beams is a wavelength absorbed by glucose and the wavelength of the other light beam is a wavelength absorbed by water. Also, the wavelengths are set so as to have equivalent extents of absorption.

The light beam output by the first light source 201 and the light beam output by the second light source 202 are multiplexed into one light beam in the multiplexer 206, and the one light beam is then incident on the pulse generation unit 101b. The pulse generation unit 101b can be constituted by a light chopper, for example. Upon receiving the light beam, the pulse generation unit 101b emits the incident light beam toward the measurement site 151 as pulsed light that has a predetermined pulse width.

The detector 207 detects the photoacoustic signal generated at the measurement site 151, converts the photoacoustic signal into an electrical signal, and transmits the electrical signal to the phase detector/amplifier 208 via a signal line. The phase detector/amplifier 208 receives a synchronization signal necessary for synchronous detection and transmitted from the oscillator 209, receives the electrical signal that is proportional to the photoacoustic signal from the detector 207, performs synchronous detection, amplification, and filtering, and outputs an electrical signal that is proportional to the photoacoustic signal. The measured and processed electrical signal (photoacoustic signal) is then stored in the external storage device 104b constituting the concentration calculation unit 104 along with information indicating the time when the electrical signal was measured.

The intensity of the signal output by the phase detector/amplifier 208 is proportional to the quantities of light absorbed by components (glucose and water) at the measurement site 151 when irradiated with the light beams output by the first light source 201 and the second light source 202, and therefore the intensity of the signal is proportional to the quantities of such components at the measurement site 151. The concentration calculation unit 104 therefore obtains the quantity (concentration) of a measurement-target substance (glucose) component in the blood at the measurement site 151 based on a measured value of the intensity of the output signal (photoacoustic signal).

As described above, two beams of light that have been subjected to intensity modulation using signals that have the same frequency are used, thus making it possible to eliminate the influence of the non-uniformity of frequency characteristics when using multiple light beams, which is a problem that occurs in the case where intensity modulation is performed using signals that have different frequencies.

However, non-linear absorption coefficient dependence of photoacoustic signals, which is a problem in measurement using photoacoustics, can be resolved by performing measurement using light beams that have different wavelengths but have the same absorption coefficient as described above (see PTL 1).

Figure 5:
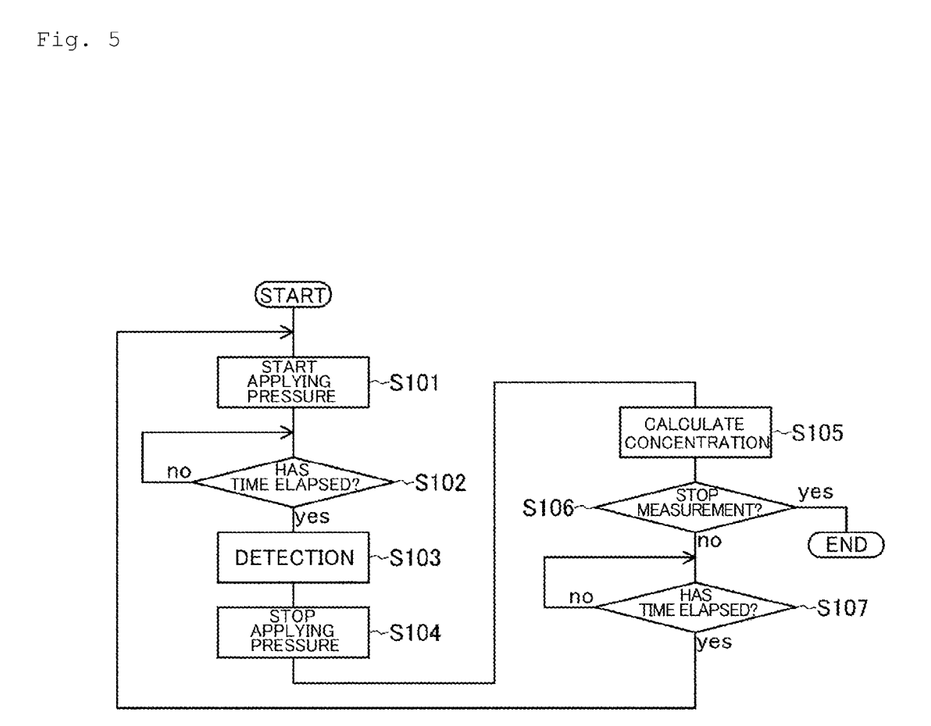
FIG. 5 is a flowchart for illustrating a component concentration measuring method according to an embodiment of the present invention.

Next, a component concentration measuring method according to an embodiment of the present invention will be described with reference to the flowchart in FIG. 5.

First, in step S101, the pressurizing unit 102 applies pressure around the measurement site 151 so as to suppress blood flow at the measurement site 151 of a measurement subject (first step). For example, when an instruction to start measurement is input to the component concentration measuring device, pressure is started to be applied around the measurement site 151. Next, when a preset time has elapsed after pressure started to be applied around the measurement site 151 (yes in step S102), the light beam 121 having a wavelength that is absorbed by the measurement target substance is emitted from the light emitting unit 101 toward the measurement site 151, and the detection unit 103 detects a photoacoustic signal generated at the measurement site 151 in step S103 (second step).

Next, when the detection unit 103 detects a photoacoustic signal, the pressure that is being applied around the measurement site 151 is stopped in step S104 (fourth step). Next, in step S105, the concentration calculation unit 104 obtains the amount (concentration) of the measurement target substance (glucose) in blood at the measurement site 151 based on the detected photoacoustic signal (third step). Next, in step S106, for example, the component concentration measuring device determines whether or not an instruction to stop measurement has been input. If an instruction to stop measurement has not been input, when a set time has elapsed after the pressure applied around the measurement site 151 was stopped (yes in step S107), the procedure returns to step S101. The above steps S101 to S107 are continued until an instruction to end measurement is input (yes in step S106).

Figure 6:
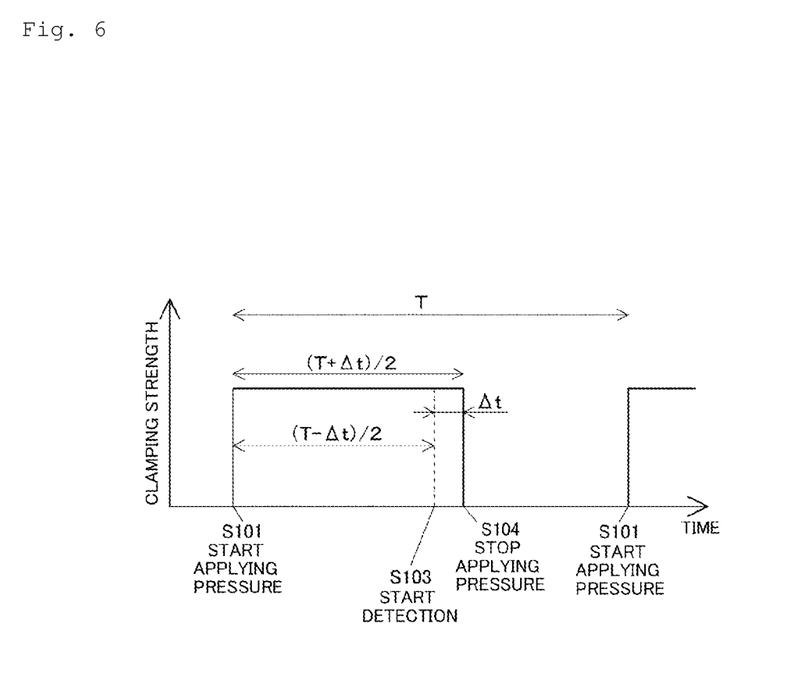
FIG. 6 is a diagram for illustrating pressure that is applied around a measurement site and a measurement interval.

Note that the length of a period (a period T) in which pressure is started to be applied around the measurement site 151 in step S101 (first step), then stopped in step S104 (fourth step), and started in the next step S101 can be set to 5 to 20 seconds. In addition, letting a time required for detecting a photoacoustic signal in step S103 be Δt, the lapsed time determined in step S102, in other words the preset time is (T−Δt)/2. Also, the time from when pressure is started in step S101 until it is stopped in step S104 is represented as (T+Δt)/2 (see FIG. 6).

Next, setting of the above-described period T will be described. For example, the period T can take a value obtained by multiplying the average value of pulsation periods of the measurement subject by a natural number n. The pulse of the measurement subject is measured at a predetermined interval such as every hour, the average value of pulsation periods is obtained, and the period T can be determined based on the obtained average value. In this case, steps S101 to S107 are repeated using the determined period T until the next pulse measurement, and, when a new period T is determined based on the next pulse measurement, steps S101 to S107 are repeated using the new period T. An interval for determining the above period T is set as appropriate. For example, a configuration may also be adopted in which, every time step S101 to S107 are repeated, the average value of pulsation periods is obtained, and the period T is updated. In addition, one period T described above can be an interval of vasomotion of the blood vessel at the measurement site 151, for example.

Note that a laser blood flowmeter can be used for measuring the pulse rate, for example (see NPL 1). The laser blood flowmeter irradiates the skin at a measurement site with infrared light from a laser beam source, and detects diffused light using a light receiving element. Light that hits erythrocytes moving in a blood vessel and diffuses causes frequency shift that is proportional to the movement speed of the erythrocytes due to doppler phenomenon of the light, and thus information regarding the flow of blood (pulse rate) can be obtained by analyzing the frequency spectrum of a detected signal.

As described above, according to embodiments of the present invention, a measurement site is irradiated with a light beam and a photoacoustic signal is detected when a set time has elapsed after pressure started to be applied around the measurement site, and thus it is possible to suppress measurement error that occurs due to a change in the state of a blood vessel when the concentration of a component such as glucose in a human body is measured using photoacoustics.

Note that the present invention is not limited to the embodiments described above, and it is clear that numerous modifications and combinations can be carried out by a person having ordinary knowledge in the art within the technical idea of the present invention.

REFERENCE SIGNS LIST

101 Light emitting unit
101a Light source unit
101b Pulse generation unit
102 Pressurizing unit
103 Detection unit
104 Concentration calculation unit
105 Control unit
111 Air bag
112 Pump
113 Pressure sensor
114 Control valve
115 Tube
121 Light beam
151 Measurement site.

The invention claimed is:
1. A component concentration measuring method comprising:
   a first step of suppressing blood flow in a measurement site of a measurement subject by applying pressure around the measurement site;
   a second step of irradiating the measurement site with a light beam having a wavelength that is absorbed by a measurement target substance, and detecting a photoacoustic signal generated at the measurement site when a set time has elapsed after the pressure of the first step has started to be applied around the measurement site;
   a third step of obtaining a concentration of the measurement target substance using the photoacoustic signal;

a fourth step of stopping applying pressure around the measurement site after detecting the photoacoustic signal; and periodically repeating the first step of starting applying the pressure, the second step of detecting the photoacoustic signal, and the fourth step of stopping applying the pressure, wherein a period from a first start of applying the pressure of the first step to a second start of applying the pressure of the first step equals an interval of vasomotion of a blood vessel at the measurement site, wherein the set time in the second step is $(T-\Delta t)/2$, and a time during which applying the pressure is stopped in the fourth step is $(T+\Delta t)/2$, wherein T is the period from the first start of applying the pressure to the second start of applying the pressure, and $\Delta t$ is a duration of detecting the photoacoustic signal in the second step wherein the measurement target substance is glucose.

2. The component concentration measuring method according to claim 1, wherein the period from the first start of applying the pressure to the second start of applying the pressure is between 5 and 20 seconds, wherein the first start and the second start are applied consecutively.

3. A component concentration measuring device comprising:

a light emitting device configured to irradiate a measurement site of a measurement subject with a light beam having a wavelength that is absorbed by a measurement target substance;

a pressurizing device configured to suppress blood flow in the measurement site by applying pressure around the measurement site;

a detector configured to detect a photoacoustic signal generated at the measurement site irradiated with the light beam emitted from the light emitting device while the pressurizing device is applying pressure around the measurement site, wherein the detector is configured to detect the photoacoustic signal when a preset time has elapsed after the pressurizing device has started applying pressure around the measurement site;

a concentration calculator configured to obtain a concentration of the measurement target substance using the photoacoustic signal; and a controller configured to:
control a pressurizing operation that is performed by the pressurizing device and a photoacoustic signal detection operation that is performed by the detector;
periodically repeat causing the pressurizing device to start applying the pressure,
causing the detector to detect the photoacoustic signal, and causing the pressurizing device to stop applying the pressure; and
set a period from a first start of applying the pressure to a second start of applying the pressure to an interval of vasomotion of a blood vessel at the measurement site, wherein the preset time set for detecting the photoacoustic signal is $(T-\Delta t)/2$, and a time during which applying the pressure is stopped is $(T+\Delta t)/2$, wherein T is the period from the first start of applying the pressure to the second start of applying the pressure, and $\Delta t$ is a duration of detecting the photoacoustic signal by the detector wherein the measurement target substance is glucose.

4. The component concentration measuring device according to claim 3, wherein:
the controller sets the period from the first start of applying the pressure to the second start of applying the pressure to 5 to 20 seconds, wherein the first start and the second start are applied consecutively.

5. The component concentration measuring device according to claim 3, wherein the light emitting device is configured to emit the light beam having a wavelength absorbed by glucose.

* * * * *